United States Patent [19]

Bemiss

[11] 4,326,445
[45] Apr. 27, 1982

[54] ARMORED UNDERBODY FOR ROAD VEHICLE

[75] Inventor: James M. Bemiss, St. Clair Shores, Mich.

[73] Assignee: Cadillac Gage Company, Warren, Mich.

[21] Appl. No.: 131,584

[22] Filed: Mar. 19, 1980

[51] Int. Cl.³ .............................................. F41H 5/00
[52] U.S. Cl. .................................... 89/36 F; 89/36 A; 89/36 R; 296/188
[58] Field of Search .................... 89/36 A, 36 R, 36 F, 89/36 G, 36 H; 109/49.5; 180/90.6; 296/187, 188, 35.2

[56] References Cited

U.S. PATENT DOCUMENTS 3,765,299 10/1973 Pagano ............................... 89/36 A
4,036,104 7/1977 Pagano ............................... 89/36 A

FOREIGN PATENT DOCUMENTS 1318145 5/1973 United Kingdom ............... 89/36 H

OTHER PUBLICATIONS

Medlin, Richard, Cole; International Publication Number: WO 80/00184, Feb. 7, 1980.

Primary Examiner—Donald P. Walsh
Attorney, Agent, or Firm—Reising, Ethington, Barnard, Perry & Brooks

[57] ABSTRACT

An armored underbody for a road vehicle is disclosed as including fabricated armor plate to protect both the vehicle underbody components and the vehicle occupant compartment from projectiles such as deflected bullets or shrapnel. A plurality of armor protection plates (16, 18, 20 and 21) of the underbody provide radiator, engine, transmission, and transfer case protection from upwardly directed projectiles. The vehicle occupant compartment floor (22) includes front and rear floor sections (24, 26) of armor plate preferably connected by a laterally extending floor support member (60). A fuel tank (28) of the underbody has a fabricated armor plate construction that prevents puncturing thereof by projectiles. In its preferred construction, the underbody includes a pair of longitudinal frame members (30) spaced laterally from each other and connected by cross frame members (32, 34, 36, 38) that are used to mount the armor protection plates. Floor support member (60) extends laterally between the longitudinal frame members (30) and is supported thereby in order to mount both the front and the rear floor sections (24, 26).

20 Claims, 9 Drawing Figures

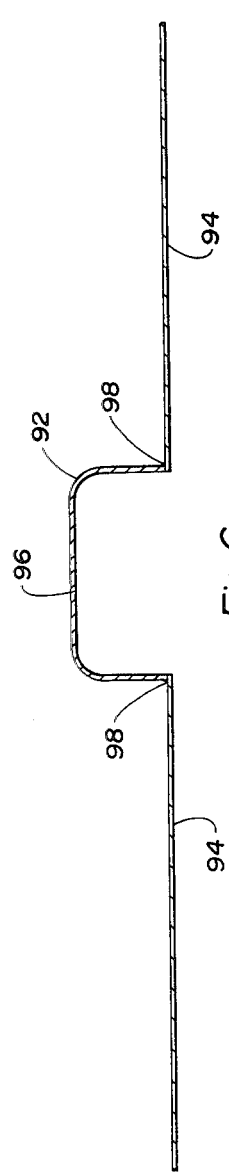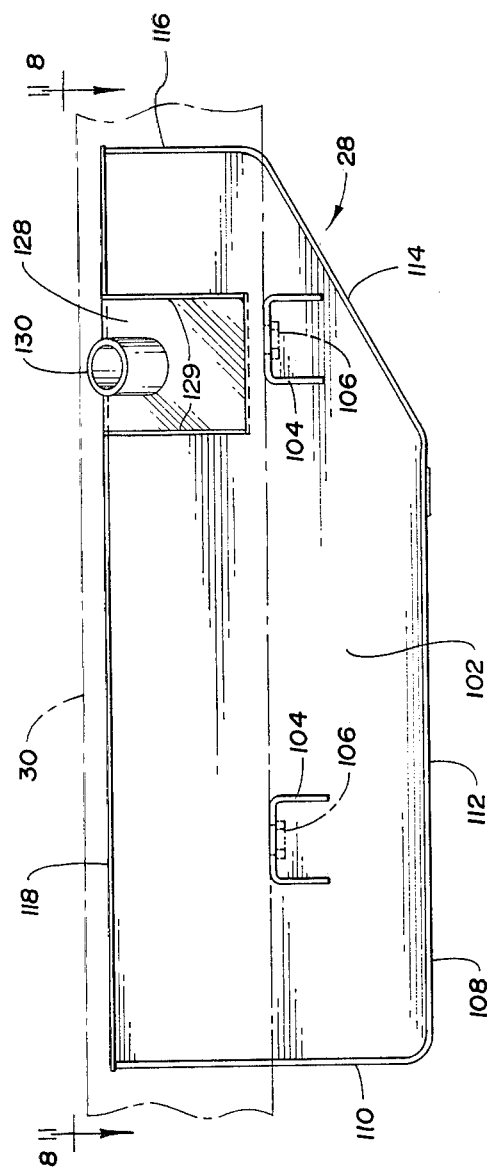

ARMORED UNDERBODY FOR ROAD VEHICLE

TECHNICAL FIELD

This invention relates generally to armored vehicles.

BACKGROUND ART

Armored vehicles with pneumatic tires for primary use on roads conventionally include a vehicle body that is fabricated from armor plate so as to provide protection of the engine and occupant compartments from horizontally and downwardly directed projectiles such as bullets or shrapnel (e.g. grenade fragments), etc. Normally no armor plate protection is provided for the underbodies of armored road vehicles as most projectiles are directed either horizontally or downwardly. However, grenades exploding below a vehicle, land mines, or deflected bullets can result in upwardly directed projectiles that do damage to a vehicle underbody.

DISCLOSURE OF INVENTION

An object of the present invention is to provide an armored road vehicle underbody that protects vehicle underbody components and the vehicle occupant compartment against damage and penetration by projectiles.

In carrying out the above object, a preferred embodiment of the armored road vehicle underbody includes a plurality of armor protection plates for providing radiator, engine, transmission, and transfer case protection from upwardly directed projectiles. A vehicle floor of the underbody includes separate front and rear floor sections of armor plate for protecting the vehicle occupant compartment from intrusion by upwardly directed projectiles. The vehicle fuel tank is fabricated from armor plate to prevent puncturing thereof by projectiles and the possible loss of fuel.

In its preferred construction, the armored vehicle underbody includes a pair of longitudinal frame members that are connected by fore and aft front cross frame members and by fore and aft intermediate cross frame members. The radiator, engine, transmission, and transfer case armor protection plates are mounted on the vehicle underbody between the longitudinal frame members as is the armor fuel tank as well. Front and rear ends of the armor protection plates located between the longitudinal frame members provide for mounting of the plates on the vehicle underbody.

The radiator protection plate mounted between the longitudinal frame members preferably includes a pair of laterally spaced rear guards that extend upwardly to provide protection from horizontally directed projectiles. The front end of the radiator protection plate is mounted on the fore front cross frame member, while the rear end thereof includes a downwardly extending mounting flange for mounting on the aft front cross frame member.

To the rear of the aft front cross frame member, the engine protection plate is mounted between the longitudinal frame members and includes a pair of armor side flanges that extend upwardly and outwardly in opposite inclined orientations as each other. A front end of the engine protection plate has a downwardly opening shape including a distal mounting flange that extends downwardly for mounting thereof on the aft front cross frame member.

The transmission protection plate has its front and rear ends provided with downwardly extending L-shaped flanges for mounting thereof on the vehicle between the longitudinal frame members. The L-shaped flange on the front end of the transmission protection plate is secured directly to the rear end of the engine protection plate, and the L-shaped flange on the rear end of the transmission protection plate is secured to the fore intermediate cross frame member. At the front end of the transmission protection plate, the L-shaped mounting flange has a shorter vertical height than the other L-shaped mounting flange at the rear end of this protection plate.

The transfer case protection plate mounted between the longitudinal frame members includes a pair of armor side flanges extending upwardly and outwardly in oppositely inclined orientations as each other. At its front end, the transfer case protection plate is secured directly to the fore intermediate cross frame member and at its rear end includes an upwardly extending L-shaped flange that is mounted on the aft intermediate cross frame member. At its rear end, the transfer case protection plate includes a rear protection flange extending upwardly and having a drive shaft opening extending downwardly from its upper edge in order to permit the vehicle drive shaft to extend therethrough between the transfer case and the rear wheel differential.

At the front ends of the longitudinal frame members, the underbody also includes side armor protection plates extending in laterally outward directions. Two of such side protection plates are preferably mounted on each longitudinal frame member with one located in front of the other. Each of the forward side protection plates includes a generally horizontal rear portion and a front inclined portion that extends downwardly in a forward direction. Each of the rearward side protection plates is inclined downwardly in a rearward direction.

Preferably, the front and rear floor sections of the occupant compartment floor are each connected to a floor support member that extends laterally with respect to the vehicle and is supported by the laterally spaced longitudinal frame members. A U-shaped cross section of the floor support member opens in a longitudinal direction preferably to the rear, and has a lower flange supported on the longitudinal frame members, a vertical wall extending upwardly from the lower flange, and an upper flange extending from the vertical wall and welded to the front edge of the rear floor section. A front flange of the support member is secured to the vertical wall thereof and to the rear edge of the front floor section. Lateral sides edges of the rear floor section are welded to flanges on side armor plates of the associated vehicle body, while lateral edges of the front floor section are secured to flanges on the side armor plates by suitable fasteners. An inclined portion of the front floor section includes a pair of laterally spaced panels and a U-shaped transmission tunnel extending between the spaced panels and secured thereto by welds.

Fabricated armor plates that are welded to each other provide the preferred construction of the fuel tank. A pair of vertical side walls of the fuel tank have a greater thickness than the rest of the walls thereof so as to provide protection from horizontal projectiles such as bullets that normally have a greater impact than upwardly directed projectiles such as shrapnel or upwardly deflected bullets. A unitary wall member of the fuel tank extends between the side walls to provide front, bottom, and rear walls. An inclined wall of the unitary wall member connects the bottom and rear walls so that projectiles directed toward the tank from the rear are deflected downwardly without puncturing the tank. A top wall extends between the side, front, and rear walls, to enclose the tank. Brackets on the side walls support the fuel tank on the longitudinal frame members.

The objects, features, and advantages of the present invention are readily apparent from the following detailed description of the best mode for carrying out the invention when taken in connection with the accompanying drawings.

BRIEF DESCRIPTION OF DRAWINGS

FIG. 6 is a sectional view taken along line 6—6 of FIG. 2 and illustrates an upwardly inclined portion of the front floor section;

FIG. 7 is taken along line 7—7 of FIG. 1 and illustrates a fuel tank of the armored underbody.

BEST MODE FOR CARRYING OUT THE INVENTION

Figure 1:
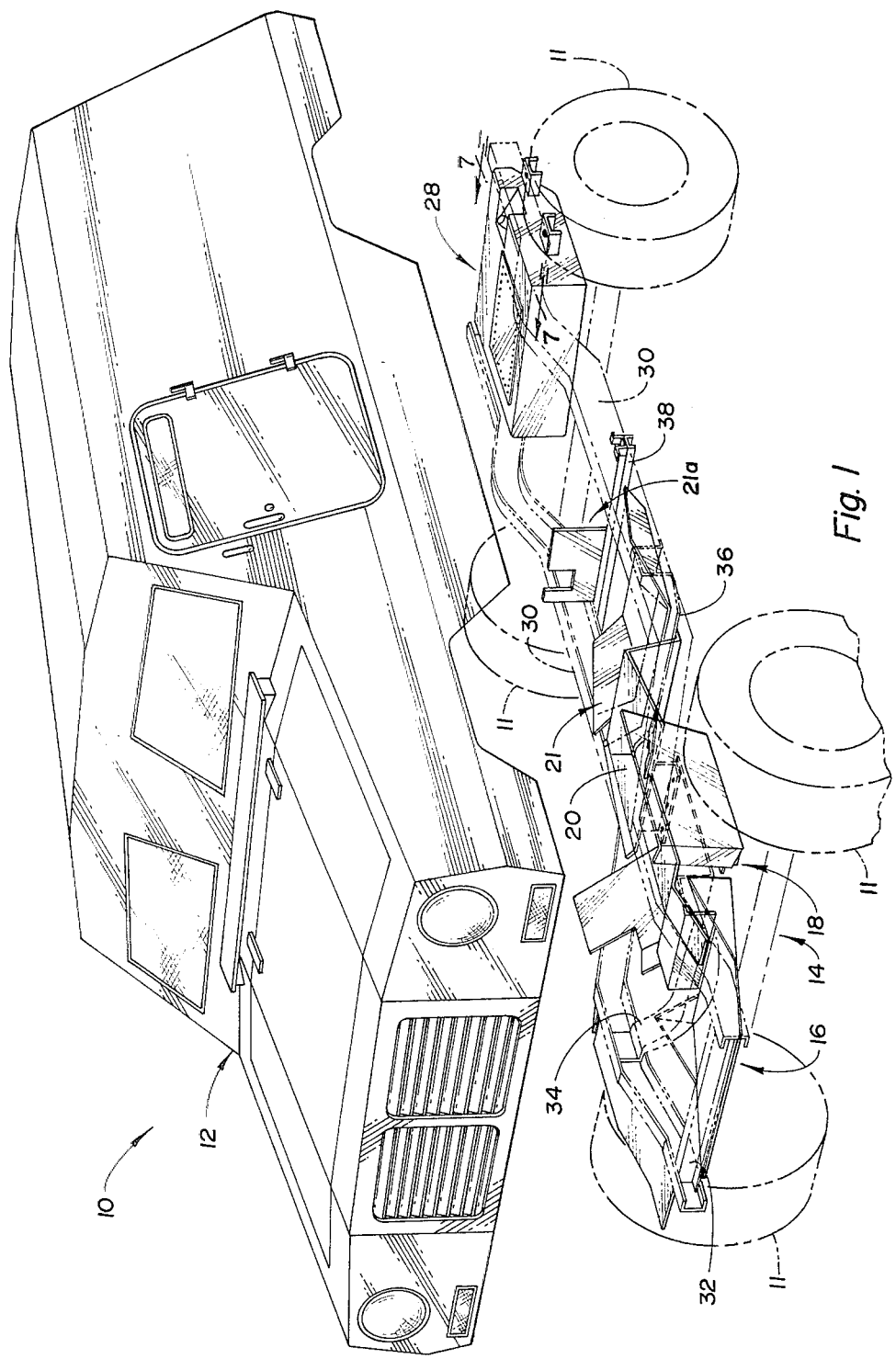
FIG. 1 is a perspective view of an armored vehicle body and chassis of the road type incorporating an armored underbody according to the present invention.
Figure 1A:
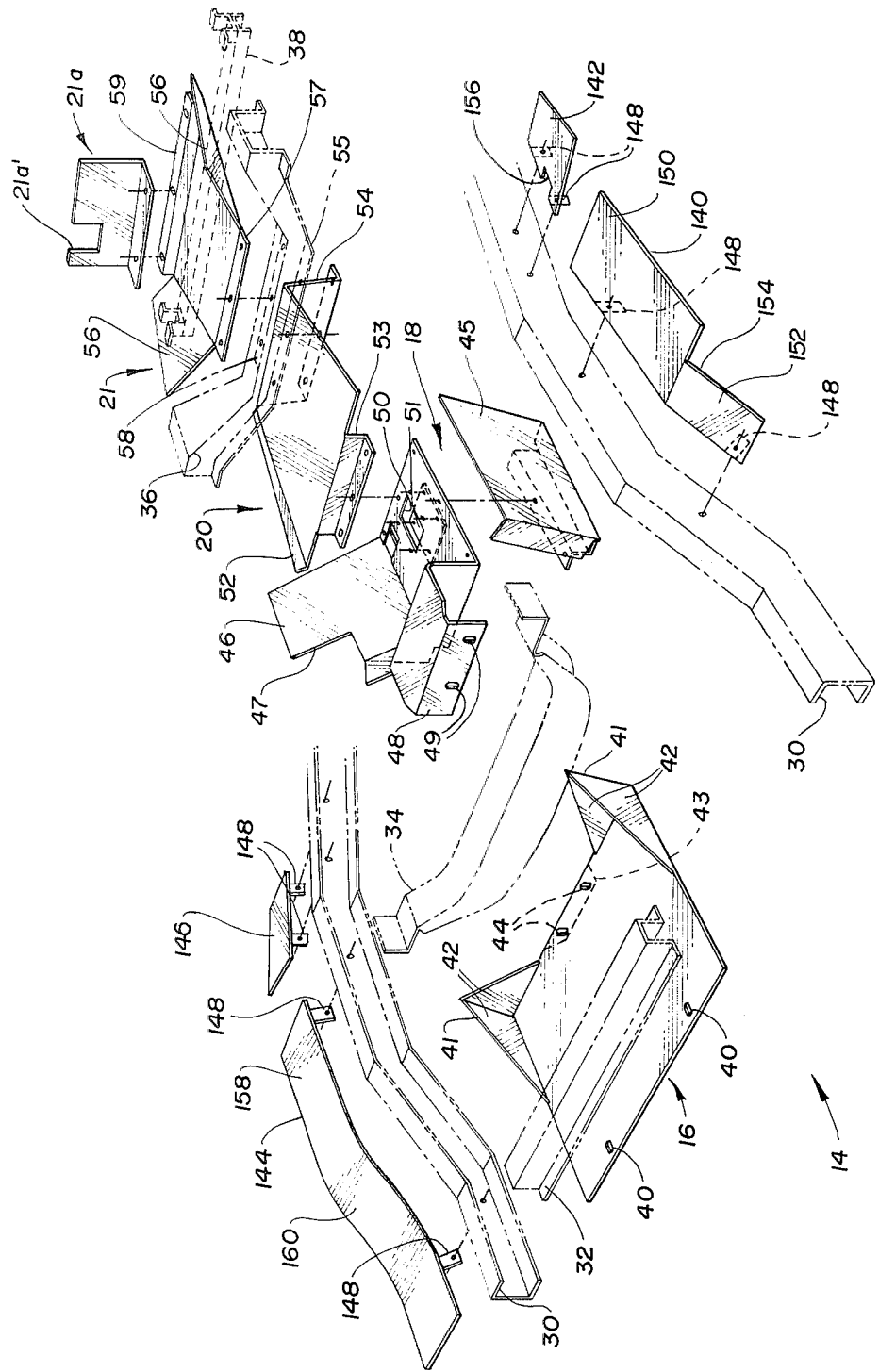
FIG. 1a is an exploded perspective view further illustrating the armored underbody shown in FIG. 1.
Figure 2:
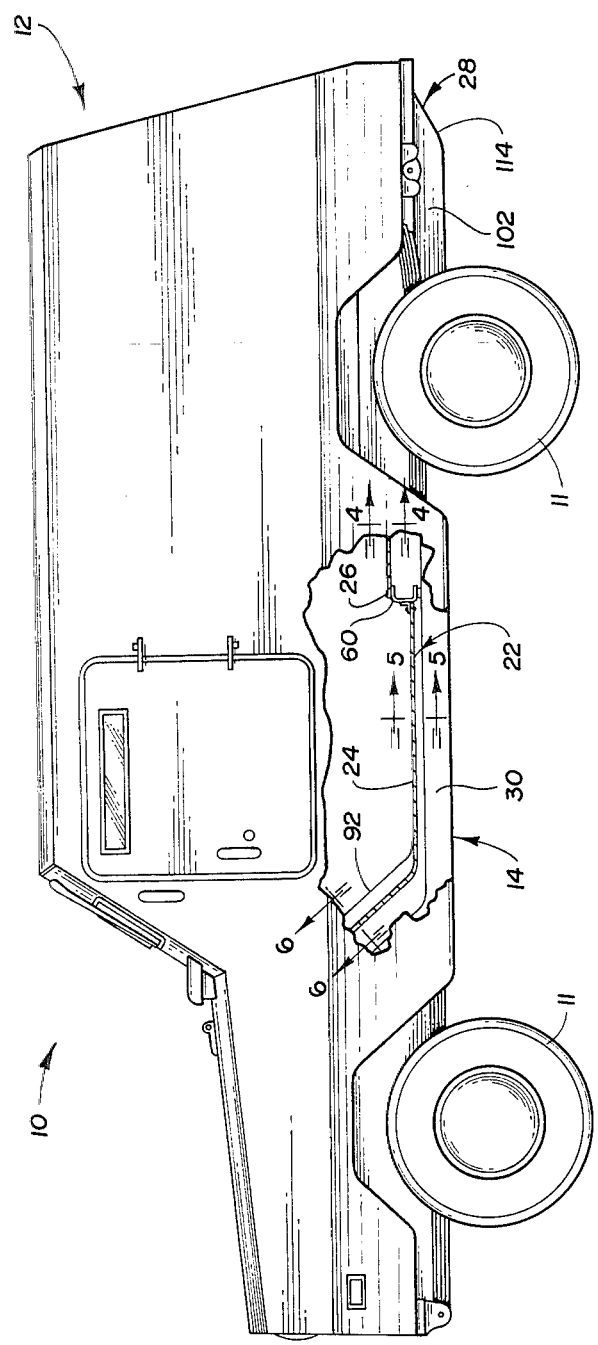
FIG. 2 is a partially broken away elevational view of the vehicle taken from one lateral side thereof to illustrate its occupant compartment floor construction.

Referring to FIGS. 1, 1a, and 2 of the drawings, an armored vehicle collectively indicated by 10 is of the road type with pneumatic tires 11 and includes an armored body 12 and a chassis 14 that cooperatively provide an armored underbody in accordance with the present invention. Armor protection plates 16, 18, 20, and 21 of the armored underbody are illustrated in FIGS. 1 and 1a and respectively provide radiator, engine, transmission, and transfer case protection against upwardly directed projectiles such as shrapnel or upwardly deflected bullets. A vehicle occupant compartment floor located to the rear of the deflection plates is identified by 22 in FIG. 2 and includes front and rear floor sections 24 and 26 of armor plate for providing occupant protection from upwardly directed projectiles. A fuel tank 28 of the armored underbody is illustrated in both FIGS. 1 and 2 and is fabricated from armor plate to prevent puncturing thereof by projectiles and the possible loss of fuel. Thus, the vehicle underbody and the associated armored body 12 cooperate to provide vehicle component and occupant compartment protection from projectiles that strike the vehicle from any direction.

As seen in FIGS. 1 and 1a, the preferred construction of the armored underbody incorporates a pair of longitudinal frame members 30 of the chassis 14. Longitudinal frame members 30 are spaced laterally from each other with respect to the vehicle and are connected by fore and aft front cross frame members 32 and 34 as well as by fore and aft intermediate cross frame members 36 and 38. Each of the armor protection plates 16, 18, 20, and 21 has front and rear ends for mounting thereof on the vehicle between the longitudinal frame members 30 as is more fully hereinafter described.

As best seen in FIG. 1a, radiator protection plate 16 includes a front end having holes 40 through which suitable threaded fasteners provide mounting thereof on the lower side of the fore front cross frame member 32. At its rear end, the radiator protection plate 16 includes a pair of laterally spaced rear guards 41 extending upwardly at its rear corners to provide protection against horizontally directed projectiles. Each rear guard 41 includes a pair of triangular armor plates 42 secured to each other and to the rear corners of plate 16 by suitable welds. At its rear end, radiator deflection plate 16 includes a downwardly extending flange 43 having holes 44 through which suitable threaded fasteners provide connection thereof to the front face on the aft front cross frame member.

Engine protection plate 18 illustrated in FIG. 1a includes a pair of armor side flanges 45 and 46 which have lower ends secured thereto by suitable fasteners and which extend upwardly and outwardly in oppositely inclined orientations as each other. Armor side flange 45 protects the engine starter as well as transmission cooling lines, while armor side flange 46 protects the engine oil filter and has a notch 47 for an exhaust system tube. A front end of engine protection plate 18 has a downwardly opening shape including a distal mounting flange 48 that extends downwardly and includes holes 49 through which threaded fasteners provide connection thereof to the rear face of the cross frame member 34. Intermediate its front and rear ends, the engine protection plate 18 includes an opening 50 that is normally closed by a cover plate 51 held in position by suitable threaded fasteners extending through associated holes. Removal of the cover plate 51 provides access to the hole 50 in order to allow the engine oil to be changed. Engine protection plate 18 also has a rear end with holes for receiving threaded fasteners that provide connection to the transmission protection plate.

Transmission protection plate 20 illustrated in FIG. 1a includes a right side flange 52 extending between its front and rear ends to provide side protection for the transmission. At its front end, plate 20 includes a downwardly extending L-shaped flange 53 which is secured directly to the rear end of engine protection plate 18 by suitable threaded fasteners. Transmission protection plate 20 also includes a rear L-shaped flange 54 which is secured to a front flange 55 on the fore intermediate cross frame member 36. Flange 53 has a shorter vertical height than flange 54 in order to provide proper positioning of plate 20 as well as plate 18.

As also best seen in FIG. 1a, transfer case protection plate 21 includes a pair of armor side flanges 56 extending upwardly and outwardly in oppositely inclined orientations as each other in order to provide side protection for the transfer case of the vehicle. At its front end, plate 51 includes a flange 57 that is secured to a rear flange 58 on the fore intermediate cross frame member 36 by suitable threaded fasteners. At its rear end, transfer case protection plate 21 includes an L-shaped flange 59 that extends upwardly and is secured to the aft intermediate cross frame member 38 by suitable threaded fasteners. An auxiliary rear protection flange 21a of the transfer case protection plate 21 extends upwardly from the rear flange 59 thereof and is secured thereto by the same threaded fasteners that secure the plate to the frame member 38. An upper edge of the rear protection flange 21a includes an opening 21a' through which the vehicle drive shaft extends between the transfer case and the rear wheel differential.

As seen by continuing reference to FIG. 1a, the longitudinally extending frame members 30 mount side armor protection plates 140, 142, 144 and 146. Each of these plates includes a pair of apertured mounting tabs 148 for providing attachment thereof to the associated frame member 30 by threaded fasteners, or the like, such that each plate extends outwardly from the associated frame member. As illustrated, the plates on the left frame member 30 are arranged with the plate 140 forward of the plate 142. Plate 140 includes a horizontal main portion 150 as well as a front portion 152 that is inclined downwardly in a forward direction and cooperates with the main portion to define an opening 154 through which the vehicle steering gear extends. Plate 140 provides protection of the vehicle power steering pump as well as hoses and electrical components. Plate 142 extends downwardly a slight extent in a rearward direction in order to provide vehicle firewall protection and includes an opening 156 through which a vehicle brake line extends. The plates on the right frame member 130 are also arranged with one in front of the other and the front plate 144 includes a horizontal main portion 158 and a front portion 160 that is inclined downwardly in a forward direction. Plate 144 provides protection for the engine cooling system hoses and overflow container. Plate 146, like the corresponding plate 142 on the other side, is inclined downwardly to a slight extent in the rearward direction and provides firewall protection.

Figure 3:
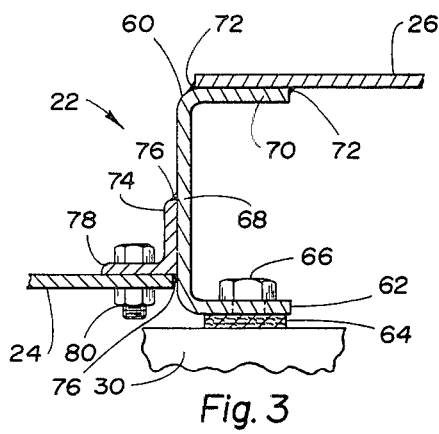
FIG. 3 is an enlarged view illustrating a portion of the floor shown in FIG. 2.

With reference to FIGS. 2 and 3, floor 22 of the armored vehicle underbody preferably includes a floor support member 60 that extends laterally between the spaced longitudinal frame members 30 so as to be supported thereby and provide connection of the front and rear floor sections 24 and 26. Floor support member 60 has a U-shaped cross section that opens in a longitudinal direction to the rear. A lower flange 62 (FIG. 3) of member 60 is supported on each of the frame members 30 by an associated fiber pad 64 and secured in position by a suitable bolt 66. From flange 62, a vertical wall 68 of member 60 extends upwardly to an upper flange 70 to which a front edge of the rear floor section 26 is secured by suitable welds 72. On its front face, vertical wall 68 has a flanged member 74 secured by welds 76 so that a flange 78 thereof extends forwardly to provide a front flange of the floor support member. The rear edge of the front floor section 24 is secured by threaded nut and bolt connections 80 (only one shown) to the lower side of the flange 78.

Figure 4:
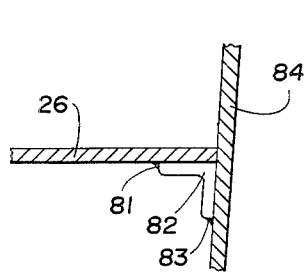
FIGS. 4 and 5 are respectively taken along lines 4—4 and 5—5 of FIG. 2 and illustrate the connection of lateral edges on rear and front floor sections to lateral side armor plates of the vehicle body.
Figure 5:
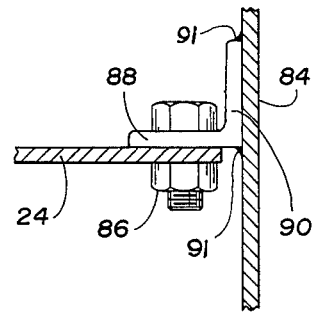

As illustrated in FIGS. 3, 4, and 5, opposite lateral edges of the front and rear floor sections 24 and 26 are secured to lateral side armor plates of the vehicle body in the same manner as the securement thereof to the floor support member 60. As illustrated in FIG. 4, each lateral edge of the rear floor section 26 is secured by a weld 81 to an L-shaped flange 82 that is secured by a weld 83 to the armor side panel 84 of the body. As illustrated in FIG. 5, each lateral edge of the front floor section 24 is secured by nut and bolt connections 86 (only one shown) to the lower side on an inwardly projecting flange 88 of a flanged member 90 that is secured by welds 91 to the armor side panel 84. The manner in which the front floor section 24 is secured by nut and bolt connections permits the front floor section to be initially positioned on the chassis 14 prior to positioning of the vehicle body thereover and securement of the connections 80 and 86 for completing the assembly.

As seen by combined reference to FIGS. 2 and 6, the front floor section 24 includes an inclined portion 92 having a pair of laterally spaced panels 94 of armor plate connected by a U-shaped transmission tunnel 96 also of armor plate. Welds 98 secure the lateral edges of the transmission tunnel 96 to the inward edges of the panels 94 while the outward edges of these panels are connected by suitable fasteners to the armor side panels of the vehicle body in a manner similar to that shown in FIG. 5.

Figure 8:
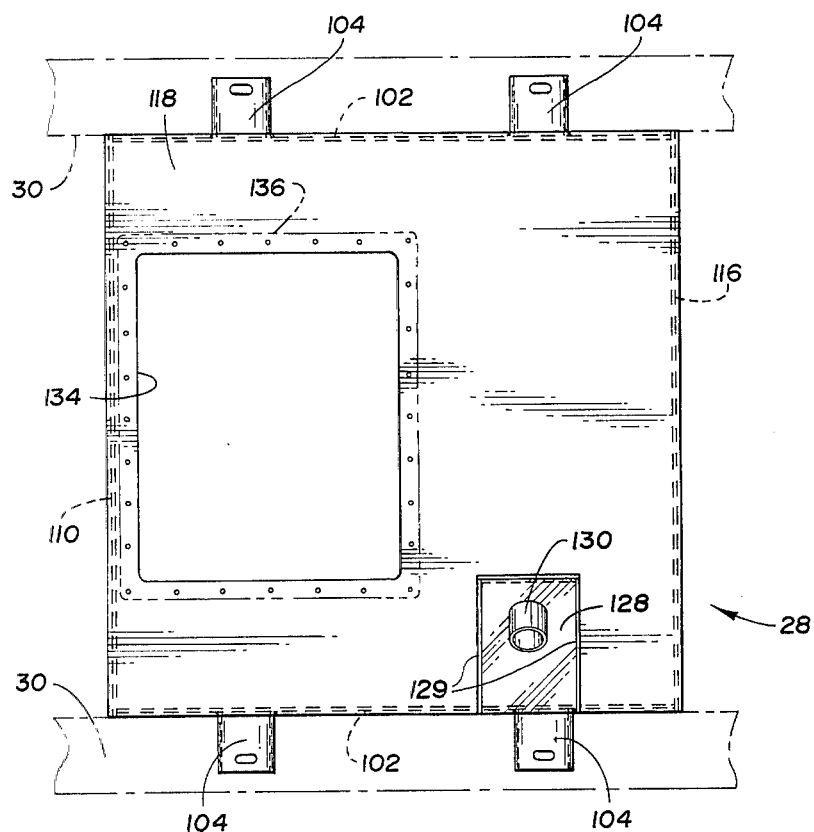
FIG. 8 is a top plan view of the fuel tank taken along line 8—8 of FIG. 7.

With reference to FIGS. 7 and 8, fuel tank 28 is fabricated from armor plate with a welded construction and is located between the longitudinal frame members 30 of the vehicle chassis. A pair of vertical side walls 102 of the fuel tank are respectively positioned adjacent the inward sides of the frame members 30 and have associated mounting brackets 104 secured thereto in any suitable manner such as by welding so as to project in an outward direction. Threaded fasteners 106 (FIG. 7) secure the brackets 104 to the lower sides of the frame members 30 so as to provide mounting of the fuel tank. A unitary wall member 108 extends between the side walls 102 to provide a front wall 110, a bottom wall 112, an inclined wall 114, and a rear wall 116. Since the side walls 102 of the fuel tank 28 are exposed to horizontally directed bullets as seen in FIG. 2, the thickness of these walls is greater than the thickness of the other armor plate from which the fuel tank is fabricated, i.e. on the order of 0.25 inches rather than 0.19 inches. Although the inclined wall 114 is exposed somewhat to horizontal projectiles, this exposure does not require as great a wall thickness since the inclination thereof deflects projectiles downwardly without puncturing as might be the case if the rear wall 116 shown in FIG. 7 were extended straight down for connection to the bottom wall 112.

As seen best in FIG. 8, a top wall 118 of the fuel tank 28 connects the side walls 102, front wall 110, and rear wall 116 to enclose the interior of the tank. At its lateral side shown in FIG. 7, the fuel tank includes an inclined wall member 128 that is welded to the adjacent side wall 102, the top wall 118, and front and rear vertical plates 129 which are likewise welded to the side and top walls. A filler tube 130 extends laterally and upwardly from the inclined wall member 128 in order to permit filling of the gas tank. Also, the top wall 118 includes a rectangular opening 134 (FIG. 8) that is selectively closed by a phantom line indicated cover plate 136 which is held in position by unshown fasteners. Suitable guage and outlet conduit mechanism can be mounted on the cover plate 136 so that the fuel can be fed to the engine and so that the fuel level within the tank can be read in a conventional fashion.

While the best mode for carrying out the invention has herein been described in detail, those familiar with the art to which this invention relates will recognize various alternative designs and embodiments for practicing the present invention as defined by the following claims.

I claim:

1. An armored underbody for a road vehicle, the underbody comprising: a pair of longitudinal frame members spaced laterally from each other; a plurality of armor protection plates mounted below vehicle underbody components to provide radiator, engine, transmission, and transfer case protection from upwardly directed projectiles; each armor protection plate having front and rear ends for mounting thereof; a vehicle floor including separate front and rear floor sections of armor plate for protecting the vehicle occupant compartment from intrusion by upwardly directed projectiles; a floor support member extending laterally between the longitudinal frame members so as to be supported thereby; said front and rear floor sections being secured to said floor support member; and a fuel tank fabricated from armor plate to prevent puncturing therof by projectiles, said fuel tank including a pair of vertical side walls respectively mounted on the longitudinal frame members, and the fuel tank also including front, bottom, rear, and top walls extending between the side walls to enclose the tank.

2. An underbody as in claim 1 wherein the radiator protection plate includes a pair of laterally spaced rear guards that extend upwardly to provide protection from horizontally directed projectiles, and the rear end of the radiator protection plate including a downwardly extending mounting flange for mounting thereof on the vehicle.

3. An underbody as in claim 2 wherein each rear guard includes a pair of triangular armor plates secured to each other and to the radiator protection plate.

4. An underbody as in claim 2 wherein the engine protection plate includes a pair of armor side flanges extending upwardly and outwardly in oppositely inclined orientations as each other.

5. An underbody as in claim 4 wherein the front end of the engine protection plate has a downwardly opening shape including a distal flange that extends downwardly for mounting thereof on the vehicle.

6. An underbody as in claim 4 wherein the front and rear ends of the transmission protection plate include L-shaped flanges extending downwardly for mounting on the vehicle.

7. An underbody as in claim 6 wherein the transfer case protection plate includes a pair of armor side flanges extending upwardly and outwardly in oppositely inclined orientations as each other.

8. An underbody as in claim 7 wherein the rear end of the transfer case protection plate includes an L-shaped flange extending upwardly for mounting on the vehicle, and further including a rear protection flange extending upwardly and having a drive shaft opening.

9. An underbody as in claim 7 wherein the vehicle includes a pair of longitudinal frame members between which the armor protection plates for the radiator, engine, transmission, and transfer case are located.

10. An underbody as in claim 7 further including at least one side armor protection plate extending in an outward direction from each longitudinal frame member.

11. An underbody as in claim 10 including two side armor protection plates on each longitudinal frame member, one side armor protection plate on each longitudinal frame member being located forward of the other one and including a portion inclined downwardly in a forward direction, and the other side armor protection plate on each longitudinal frame member including a portion inclined downwardly in a rearward direction.

12. An underbody as in claim 1 or 11 wherein the floor support member has a U-shaped cross-section that opens longitudinally, and said floor support member including flanges respectively secured to the front and rear floor sections.

13. An underbody as in claim 12 wherein the U-shaped floor support member opens rearwardly.

14. An underbody as in claim 12 wherein the front floor section includes an inclined portion having a pair of laterally spaced panels and a U-shaped transmission tunnel extending therebetween.

15. An underbody as in claim 1 or 11 wherein the fuel tank includes a unitary wall member extending between the side walls to provide the front, bottom, and rear walls of the fuel tank.

16. An underbody as in claim 15 wherein the unitary wall member of the fuel tank includes an inclined wall connecting the bottom and rear walls defined thereby so that projectiles directed toward the tank from the rear are deflected downwardly.

17. An underbody as in claim 16 wherein the side walls of the fuel tank have a greater thickness than the unitary wall member that provides the front, bottom, inclined, and rear walls.

18. An armored underbody for a road vehicle, the underbody comprising: a pair of longitudinal frame members spaced laterally from each other; a plurality of armor protection plates mounted below vehicle underbody components to provide radiator, engine, transmission, and transfer case protection from upwardly directed projectiles; each armor protection plate having front and rear ends for mounting thereof; a floor including separate front and rear floor sections of armor plate for protecting the vehicle occupant compartment from intrusion by upwardly directed projectiles; a floor support member extending laterally between the longitudinal frame members so as to be supported thereby; said floor support member including a pair of flanges respectively secured to the front and rear floor sections; and a fuel tank fabricated from armor plate to prevent puncturing thereof by projectiles and including a pair of vertical side walls respectively mounted on the longitudinal frame members, a unitary wall member extending between the side walls to provide front, bottom, and rear walls of the tank, and a top wall extending between the side, front, and rear walls to enclose the tank.

19. An armored underbody for a road vehicle, the underbody comprising: a pair of longitudinal frame members spaced laterally from each other; fore and aft front cross frame members and fore and aft intermediate cross frame members extending laterally between the longitudinal frame members; four armor protection plates for respectively providing radiator, engine, transmission, and transfer case protection from upwardly directed projectiles; each armor protection plate having front and rear ends for mounting thereof; the front and rear ends of the radiator protection plate being respectively mounted on the fore and aft front cross frame members; the front end of the engine protection plate being mounted on the aft front cross frame member; the rear end of the engine protection plate being secured to the front end of the transmission protection plate; the rear end of the transmission protection plate and the front end of the transfer case protection plate each being secured to the fore intermediate cross frame member; the rear end of the transfer case protection plate being secured to the aft intermediate cross frame member; a floor including separate front and rear floor sections of armor plate for protecting the occupant compartment from intrusion by upwardly directed projectiles; a floor support member extending laterally between the longitudinal frame members so as to be supported thereby; said floor support member having a U-shaped cross section including a lower flange supported on the longitudinal frame members, a vertical wall extending upwardly from the lower flange, and an upper flange extending from the vertical wall and secured to the rear floor section; a flange mounted on the vertical wall of the floor support member and secured to the front floor section; and a fuel tank fabricated from armor plate to prevent puncturing thereof by projectiles and including a pair of vertical side walls respectively mounted on the longitudinal frame members, a unitary wall member extending between the side walls to provide front, bottom, and rear walls of the tank, and a top wall extending between the side, front, and rear walls to enclose the tank.

20. An armored underbody for a road vehicle, the underbody comprising: a pair of longitudinal frame members spaced laterally from each other; fore and aft front cross frame members and fore and aft intermediate cross frame members extending laterally between the longitudinal frame members; four armor protection plates for providing radiator, engine, transmission, and transfer case protection from upwardly directed projectiles; each armor protection plate having front and rear ends for mounting thereof; the front end of the radiator protection plate being mounted on the fore front cross frame member and the rear end thereof including a pair of upwardly extending guards as well as a downwardly extending flange mounted on the aft front cross frame member; the engine protection plate including a pair of armor side flanges and the front end thereof having a downwardly extending flange mounted on the aft front cross frame member; the front end of the transmission protection plate having a downwardly extending flange secured to the rear end of the engine protection plate; the rear end of the transmission protection plate having a downwardly extending flange secured to the fore intermediate cross frame member; the transfer case protection plate including armor side flanges extending upwardly and outwardly in oppositely inclined orientations and the front and rear ends thereof being respectively secured to the fore and aft intermediate cross frame members; a floor including separate front and rear floor sections of armor plate for protecting the vehicle occupant compartment from intrusion by upwardly directed projectiles; a floor support member extending laterally between the longitudinal frame members so as to be supported thereby; said floor support having a U-shaped cross-section that opens to the rear and includes a lower flange supported on the longitudinal frame members, a vertical wall extending upwardly from the lower flange, and an upper flange extending from the vertical wall and secured to the rear floor section; a front flange mounted on the vertical wall of the floor support member and secured to said front floor section; and a fuel tank fabricated from armor plate to prevent puncturing thereof by projectiles and including a pair of vertical side walls respectively mounted on the longitudinal frame members, a unitary wall member extending between the side walls to provide front, bottom, and rear walls of the tank, the unitary wall member also including an inclined wall connecting the bottom and rear walls defined thereby so that projectiles directed toward the tank from the rear are deflected downwardly, and a top wall extending between the side, front, and rear walls to enclose the tank.

* * * * *